US009652834B2

United States Patent
Mocanu et al.

(10) Patent No.: US 9,652,834 B2
(45) Date of Patent: May 16, 2017

(54) METHOD AND APPARATUS FOR VIEWING IMAGES

(71) Applicant: Fotonation Limited, Galway (IE)

(72) Inventors: Valentin Mocanu, Bucharest (RO); Petronel Bigioi, Galway (IE); Peter Corcoran, Claregalway (IE); Christopher Dainty, Barna (IE); Ferenc Papai, Galway (IE)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 14/496,881

(22) Filed: Sep. 25, 2014

(65) Prior Publication Data
US 2015/0093038 A1 Apr. 2, 2015

Related U.S. Application Data

(63) Continuation of application No. 13/767,877, filed on Feb. 14, 2013, now Pat. No. 8,849,064.

(51) Int. Cl.
*G06K 9/00* (2006.01)
*G06T 5/00* (2006.01)
(Continued)

(52) U.S. Cl.
CPC ............... *G06T 5/003* (2013.01); *G06T 5/50* (2013.01); *H04N 5/2356* (2013.01);
(Continued)

(58) Field of Classification Search
None
See application file for complete search history.

(56) References Cited

U.S. PATENT DOCUMENTS 6,538,249 B1 * 3/2003 Takane et al. .............. 850/9
7,538,814 B2 * 5/2009 Igarashi et al. ............ 348/349
(Continued)

FOREIGN PATENT DOCUMENTS

WO WO2012/132241 10/2012

OTHER PUBLICATIONS

Specification: Method and Apparatus for Viewing Images, 32 pages.
(Continued)

*Primary Examiner* — Soo Jin Park

(57) ABSTRACT

A computer-implemented method for viewing images on an interactive computing device comprises displaying an image from a stack comprising a display image and at least one compressed sub-image of nominally the same scene, each of the sub-images of the stack having been acquired at respective focal distances. Responsive to a user selecting a portion of the displayed image, the selected portion is mapped to a corresponding mapped portion of a sub-image within the stack according to the difference in focal distances between the displayed image and the sub-image. At least one row of compressed image blocks of the at least one sub-image extending across the mapped portion; and a reference value for a point in the compressed image stream of the sub-image preceding the row of compressed image blocks is determined. Using the reference, the row of blocks of the sub-image at least partially decoded, and a measure of focus for an area of the mapped portion coinciding with the decoded image blocks is computed to determine if at least that content of the sub-image should be displayed within a display image.

26 Claims, 7 Drawing Sheets

(51) Int. Cl.
*G06T 5/50* (2006.01)
*H04N 5/232* (2006.01)
*H04N 5/235* (2006.01)

(52) U.S. Cl.
CPC ..... *H04N 5/23212* (2013.01); *H04N 5/23232* (2013.01); *H04N 5/23293* (2013.01); *G06T 2200/21* (2013.01); *G06T 2207/10148* (2013.01); *G06T 2207/20052* (2013.01); *G06T 2207/20104* (2013.01); *G06T 2207/20221* (2013.01)

(56) References Cited

U.S. PATENT DOCUMENTS

| | | | | |
|---|---|---|---|---|
| 8,107,771 | B2* | 1/2012 | Sako et al. | 382/298 |
| 8,482,651 | B2* | 7/2013 | Asukai et al. | 348/333.12 |
| 8,526,761 | B2* | 9/2013 | Kojima et al. | 382/283 |
| 8,570,429 | B2* | 10/2013 | Park et al. | 348/348 |
| 2001/0013895 | A1 | 8/2001 | Aizawa et al. | |
| 2006/0061678 | A1* | 3/2006 | Yamazaki | 348/349 |
| 2010/0066840 | A1* | 3/2010 | Asukai et al. | 348/207.1 |
| 2011/0262038 | A1 | 10/2011 | Prilutsky et al. | |
| 2014/0226914 | A1 | 8/2014 | Mocanu et al. | |

OTHER PUBLICATIONS

Khire et al. hybrid DPCM-DCT based approach for compression of Z-stack images, IEEE EMBS, dated 2012, 4 pages.

Jeong et al., "Interactive Histology of Large Scale Biomedical Images Stacks", IEEE, vol. 16, No. 6, dated Nov. 2010, 10 pages.

European Patent Office, "Search Report" in application No. PCT/EP2014/051351, dated May 12, 2014, 14 pages.

U.S. Appl. No. 13/767,877, filed Feb. 14, 2013, Notice of Allowance, May 22, 2014.

\* cited by examiner

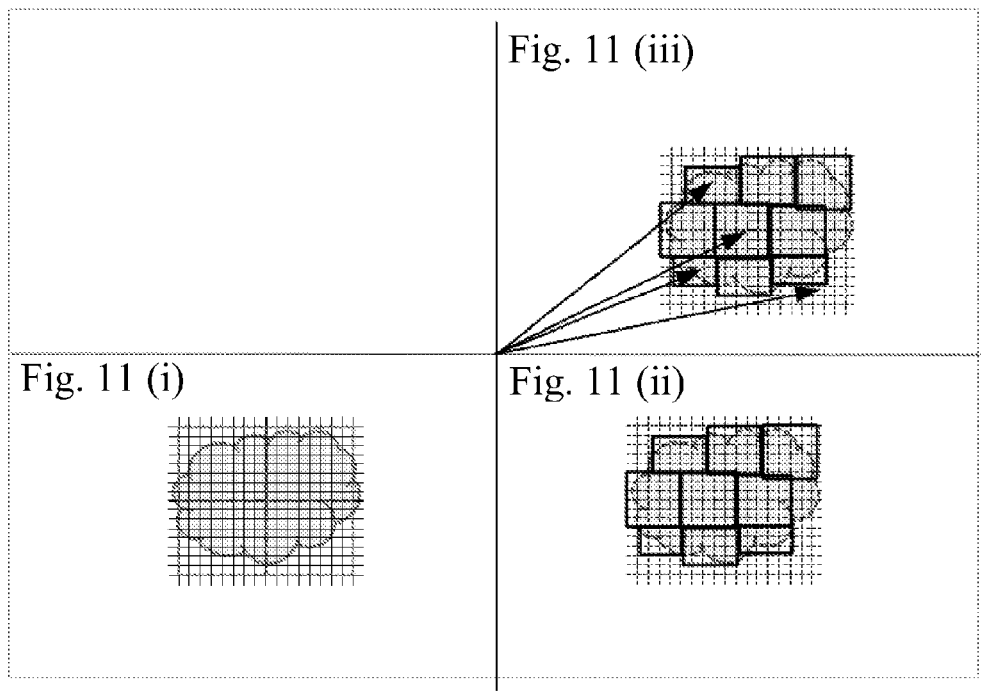

METHOD AND APPARATUS FOR VIEWING IMAGES

This application claims benefit under 35 U.S.C. §120 as a Continuation of application Ser. No. 13/767,877, filed Feb. 14, 2013, the entire contents of which are hereby incorporated by reference as if fully set forth herein. The applicants hereby rescind any disclaimer of claim scope in the parent application or the prosecution history thereof and advise the USPTO that the claims in this application may be broader than any claim in the parent application.

TECHNICAL FIELD

The present approach relates to a method and apparatus for viewing images.

BACKGROUND

Recently plenoptic or light-field imaging has entered into the consumer domain with the introduction of cameras from manufacturers such as Lytro and Raytrix. Plenoptic imaging offers the potential to refocus a digital image after acquisition.

While these techniques capture additional scene depth and lightfield information over a conventional camera, they generate complicated datasets which are significantly larger than conventional images and require sophisticated post processing to regenerate a conventional image with different parameters. Furthermore, they are incompatible with existing image compression techniques and require proprietary viewing software. Thus the benefits of such advanced imaging techniques cannot readily be enjoyed on conventional consumer devices such as smartphones and tablets, or viewed using Web/Internet technologies.

FIG. 1 shows a typical scene including two faces 10, 12; and FIG. 2 illustrates the operation of a prior art auto-focus algorithm for the scene as a function of distance from the camera. This is a conventional "hill-climbing" algorithm which captures an initial preview image of the scene and calculates a focus measure on one or more portions of the acquired image. Note that modern imaging devices automatically perform functions such as face-tracking and foreground/background separation on the individual frames of the preview stream and thus the focus measure is generally not calculated over the entire image, but rather on specific regions of interest (ROI) such as faces and foreground objects within the image.

In FIG. 2 we show the focus measure for the scene as calculated over the area involving the near face 10 of FIG. 1 (steps 1-4) and also the focus measure as calculated over the mid-distance face 12 of FIG. 1.

The simplest focus measure will just measure the local contrast and/or sharpness over the selected ROI of the image. However there are more sophisticated focus measures available in the literature.

It will be appreciated that there are many available auto-focus algorithms described in the literature, and hill-climbing algorithm of FIG. 2 is just a simple example. Note that the focal distance, shown along the X-axis of FIGS. 2, 3 & 5, is on a logarithmic scale. This is typical of the focus adjustment where there are more focus steps close to the camera, and beyond a distance of 3-5 m the camera is effectively focused at infinity.

In FIG. 2, the camera first focuses at distance "1" which is about 18 cm from the camera. This provides a very weak focus measure over the ROI of the near face, so the distance is adjusted to about 35 cm which yields a stronger focus measure, '2', but still below the desired threshold (c. 0.9); a third adjustment, '3', to 65 cm yields a higher focus measure, but based on the size of the face region the algorithm realizes that it has over-shot and re-adjusts the distance to just below 50 cm which is close enough to yield a focus measure at, or above the required threshold.

Now this example is a very simple one, and typically the auto-focus algorithm may take several additional focusing steps to arrive correctly at an optimal focus point. The algorithm is also dependent on the ROI selected to calculate the focus measure, the accuracy of this ROI and any additional information available. In the simple example provided above it was assumed that the focus algorithm would know that step "3" was beyond the optimal focus distance based on a knowledge of the size of the face ROI. If this information was not available, the algorithm would have continued to adjust the focus to a greater distance, and only on determining that the focus measure had decreased (step 4) would it have realized that the focus adjustment should have been to a distance between "3" and "2" (step 5).

Typically, therefore, an auto-focus process will take more steps than shown here. Nonetheless, at the end of the process a single main, in-focus, image is acquired.

In a video system, auto-focus operates a bit differently. As every frame is saved by a video acquisition process the focusing algorithm has two main stages.

In the first stage the focusing algorithm behaves essentially as for the digital camera auto-focus algorithm and the focus may change by quite large shifts in distance until a focus measure above the required threshold is achieved.

After this initial focus is achieved the video camera will continue to adjust the focus, but in smaller increments. In the context of the example above, after the initial focus one each following frame a focus change of only one step +/− is allowed. Thus if the focus measure on the near face 10 drops below the threshold it is only possible to adjust by one step nearer, or more distant from this initial focus on the next image frame. (Or if the frame rate is high, or the focus system has high inertia it may only be possible to change focus every 2-4 frames); the video algorithm must limit focus changes in this way to avoid "focus jumping" or "focus hunting" effects which can easily occur due to the complex and constantly changing nature of video scenes.

Thus video focusing comprises an initial auto-focus phase, which allows large focus adjustments until an initial focus is achieved. This is followed by a second "small adjustments" phase to allow focus to track the main ROI(s) within a scene without making sudden jumps in focus that would be disconcerting to the viewer.

Separately, focus stacking is a technique used in photography to capture multiple images at different focus lengths and combine these into a single "in-focus" image. The technique is typically applied to macro photography for objects close to the camera lens and focus increments may be only a few centimeters and over a range of focal lengths of less than 30-50 cm.

US 2010/0283868, Clark & Brown discloses a system for taking motion pictures of a scene with different parts at different focal lengths with a camera that normally would not have sufficient depth of field to capture all parts of said scene in focus. A computer controls a high-speed, digital camera and a lens with rapid focus capability to produce a stack of images at different focal lengths for rapid processing into a composite serial image montage stream in motion picture output format. Operator controls permit continuous selection of depth of field (DOF) in the output image and enable a plurality of in-focus and out-of-focus regions over the depth of an image. An optional output port provides for real-time recordation of all images in each stack for later processing. An optional remote control duplicates the main controls in the camera system so that a second person can assist in optimizing images as they are recorded, or for remote control of the camera itself.

It is an object of the present invention provide an improved method and apparatus for viewing stacked images.

SUMMARY OF THE INVENTION

According to the present invention there is provided a method according to claim 1.

According to a further aspect, there is provided an interactive computing device according to claim 23.

According to a still further aspect, there is a provided a non-transitory, tangible computer readable storage medium comprising executable instructions which when executed in an interactive computing device are arranged to perform the steps of claim 24.

The present invention allows for the manipulation of images so that they can be displayed with different focus points. These images can be captured on any conventional digital camera capable of rapidly changing scene focus between image frames. Thus, the invention provides much the same benefits as plenoptic imaging, but using conventional optics, for example, a MEMS based focus module, and the images can be handled, managed, viewed and shared using the same software infrastructures as for conventional JPEG images or MPEG video streams.

By contrast with the present invention, Clark & Brown do not describe compressed permanent storage for the final set of stacked images, nor selectively decompressing and accessing specific regions within the focus stack. Clark & Brown are not concerned with compensating for radial shifting and lens distortions, nor enabling a user to re-focus and/or to selective re-composite the displayed image on a computer display or touch-screen device.

BRIEF DESCRIPTION OF THE DRAWINGS

Embodiments of the Invention will now be described by way of example, with reference to the accompanying drawings, in which:

FIGS. 11(*i*) to (*iii*) illustrate a processing sequence for an image including a large object (a cloud) partitioned into a number of sub-blocks.

DESCRIPTION OF THE PREFERRED EMBODIMENTS

The present invention further provides a viewer application which manipulates an acquired stacked image in response to user interaction, the stacked image having been acquired with an imaging device having a progressive focus & acquire mode rather than or in addition to a normal auto-focus mode. The viewer application can run on an image acquisition device or on a separate computer device which has access to the stacked image.

Image Acquisition

Figure 3:
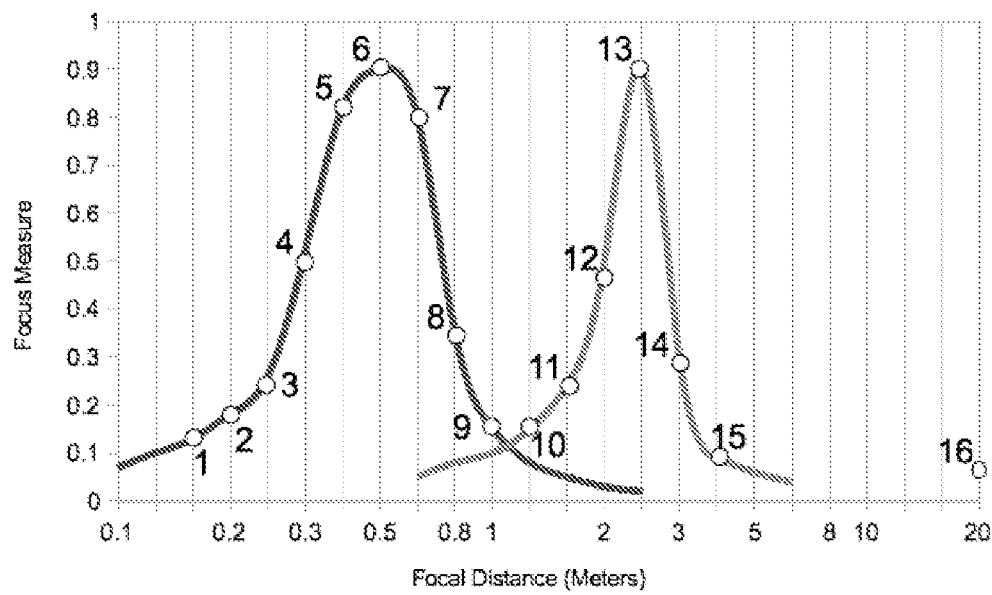
FIG. 3 illustrates the focal steps for an image acquisition sequence according to an embodiment of the present invention.
Figure 4:
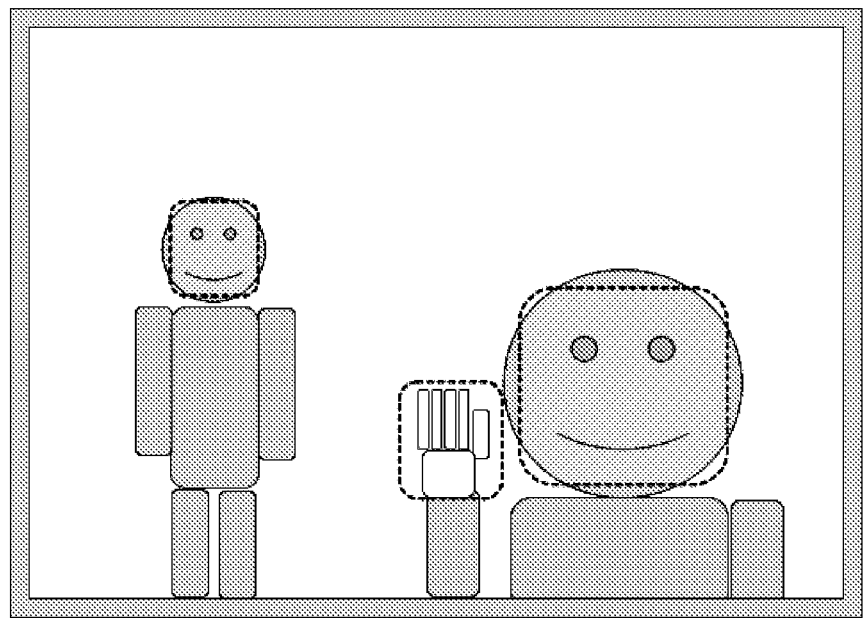
FIG. 4 illustrates a typical scene similar to FIG. 1, but the near person has raised their hand to create a third focal region closer to the camera.
Figure 5:
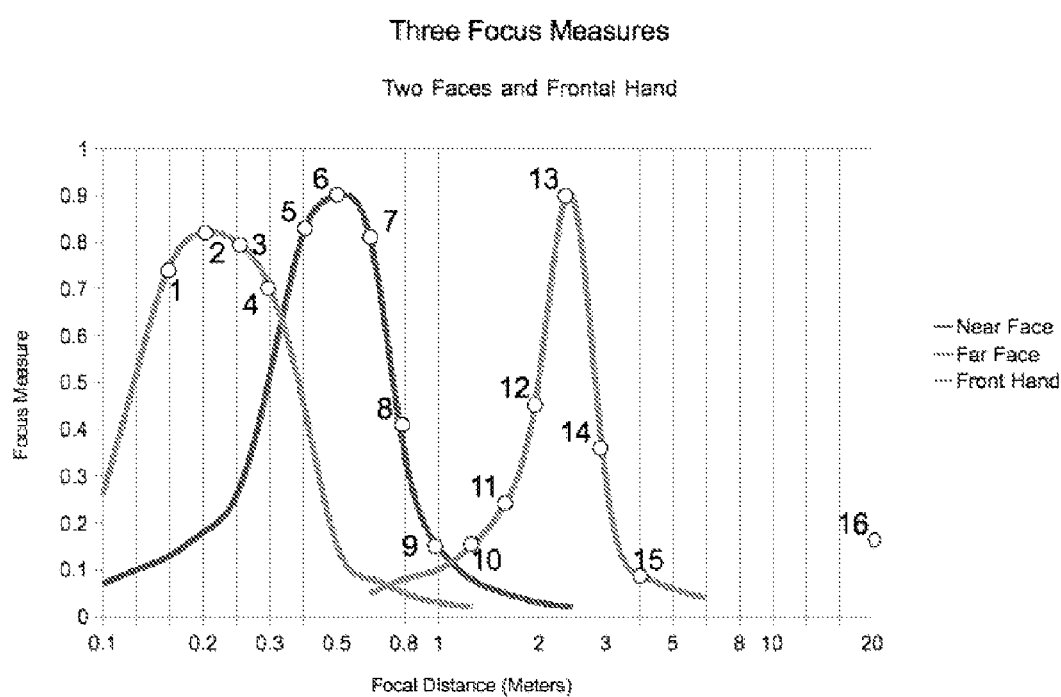
FIG. 5 illustrates the focal steps for an image acquisition sequence according to the present invention applied to the scene in FIG. 4.

Turning first to the acquisition of the stacked image for use within the viewer application according to an embodiment of the invention. In the progressive focus & acquire mode, the camera may continue to perform auto-focus and operate as a conventional camera. This assists the user to compose a main image that is to be acquired. However, when the user triggers image acquisition, the camera acquires multiple images, each at a different focus point. This is illustrated in FIG. 3 which shows 16 different focus distances at which a stacked image of a scene is acquired.

Figure 1:
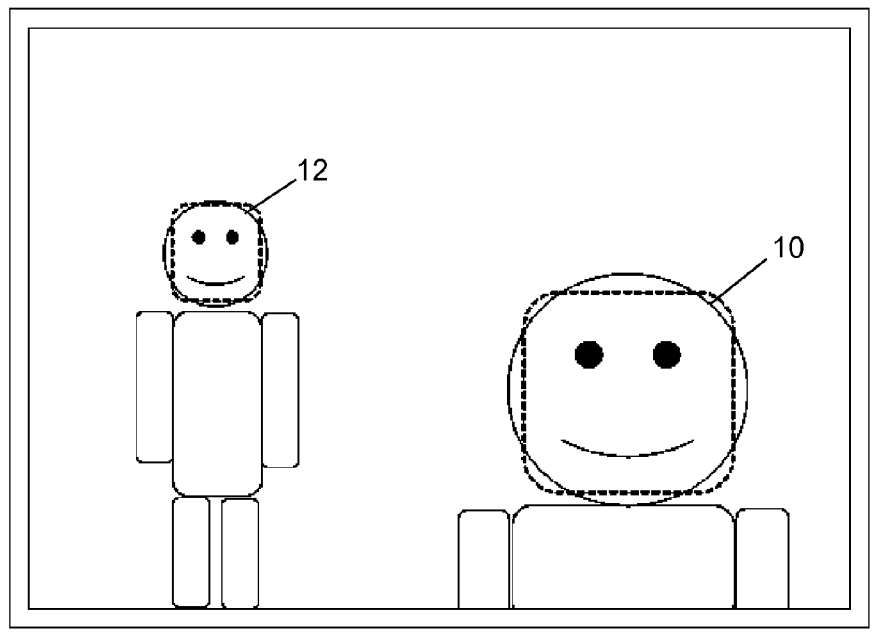
FIG. 1 shows a typical image scene containing two people; one is quite close (<1 m) to the camera while the other person is more distant from the camera (c. 2-3 m distant).
Figure 2:
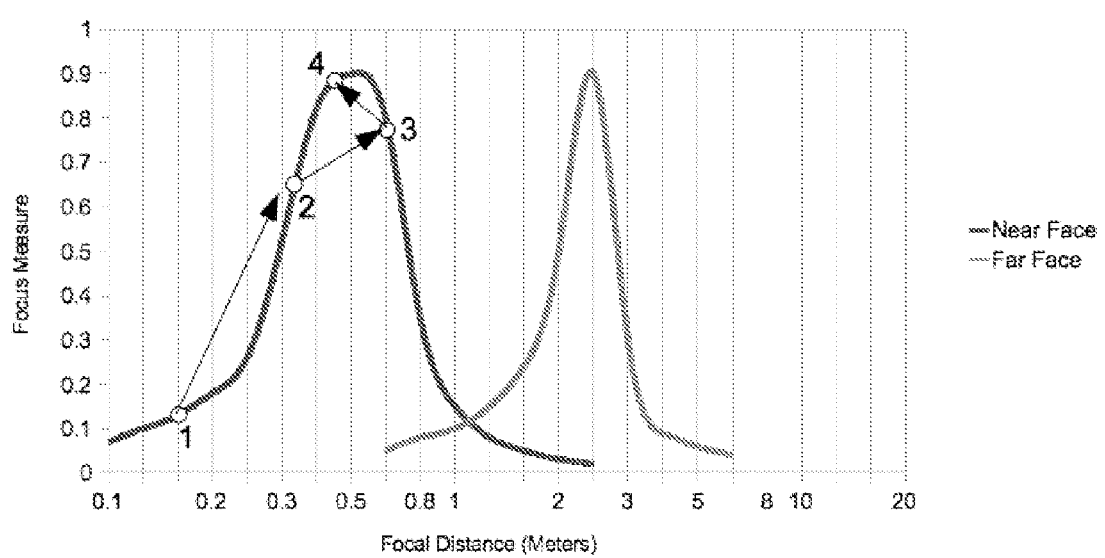
FIG. 2 shows the focus measures for the two face regions of FIG. 1 and illustrates a "hill-climbing" auto-focus operation on the near face region.

In the preferred embodiment the camera operates as a conventional camera so that the camera is initially focused at point "6", to obtain a first main image with optimal focus on the near face 10 of FIG. 1. However the camera will subsequently cycle through the other focus steps in an order which optimizes the performance of the focusing subsystem.

In a preferred embodiment the focusing subsystem comprises a MEMS subsystem and can move in a millisecond timeframe to position itself at each of the relevant focus points. In such an embodiment, additional images are acquired in the sequence 6-7-8-9-10-11-12-13-14-15-16, then returning to 1-2-3-4-5 to complete the acquisition sequence.

For a camera operating at 50-60 fps, this acquisition sequence should take only 250 ms and there should be minimal movement between adjacent image frames. However in some embodiments it may be desirable to achieve a global registration between image frames that have been acquired at such different focal distances. In particular for handheld devices such as smartphones, it is more likely that some handshake will occur and thus some compensation is required to ensure a reasonable degree of global registration. Camera gyro/accelerometer data can be used to assist with determining this relative movement between image frames and the compensation required.

More specifically, techniques are known in the literature for frame-to-frame alignment of video frames. Examples include (i) Deever, A. "In-camera all-digital video stabilization", Proceedings of the International Conference on Decision Support Systems, January 2006, pp. 190-193; and (ii) Albu, F., et al. "Low Complexity Global Motion Estimation Techniques for Image Stabilization." Consumer Electronics, 2008. ICCE 2008. Digest of Technical Papers, International Conference on. IEEE, 2008. These techniques are typically used to stabilize vertical jitter in video sequences or to stitch panorama images together. In the current application, they can be used to determine any XY offset due to handshake motion between image frames as they are acquired. As long as the focus magnification effect (explained below) is gradual between frames these techniques can provide sufficient global registration. Thus in the acquisition sequence described above, this frame-to-frame alignment will be applied between focus points 6 and 7, 7 and 8 up to 16; but not between focus points 16 and 1. Alignment will resume between focus points 1 and 2, 2 and 3 and so on.

The correction will typically be applied at the acquisition stage so that each individual image frame will be corrected so as to align at a global level with the previous frame. In one preferred embodiment where sufficient high-speed memory is available, the XY offsets of all images in a focus stack are stored with the acquired images in memory and adjustment of individual frames is made when all offsets of an acquisition sequence are known. In this case, an optimally positioned (mean) image frame can be used as a baseline and images will only be compressed after a precise global alignment is determined. In alternative embodiments, the starting frame (best scene focus) will be the baseline frame and XY movement of subsequent frames will be applied from this reference, each frame being compressed immediately after its alignment is adjusted.

Another way to deal with registering stacked images is to take the main image as a reference and measure the x,y shifts between this and each sub-image, and then store the delta shifts (between images with adjacent focal distances) with the compressed current picture (in metadata). Here, no image stabilization correction would be required. In the viewer application described below, those shifts associated with each image would be used to adjust the display position on the screen (and also to adjust for "focus magnification", the region that is evaluated for sharpness in selecting the sharpest image in the stack).

Thus, some frame-to-frame registration is used to ensure that adjacent frames are globally aligned. However the field of view applied to a scene will change as focus is adjusted, particularly when the focus adjustment spans from a distance very close to the camera up to infinity. This leads to a scaling effect on the imaged scene, which must be taken into account when processing acquired stacked images as described later. This change in field of view can be mitigated by using a particular lens configuration known as a telecentric lens, however the preferred embodiment uses a non-telecentric lens that preferably emphasizes this effect. This change in field of view is sometimes known as 'focus magnification', as it causes a noticeable magnification of the imaged scene as the focus moves close in to the lens. Thus, while the acquired image frames are globally aligned, there is local misalignment caused by 'focus magnification'. This is particularly noticeable for objects that are close to the camera (<1.5 meter) and the effect diminishes for more distant objects.

Other distortion effects occur because the focal plane is not mapped perfectly onto the imaging sensor, rather there are distortions that depend on the radial distance from the main optical axis. Where the viewer application runs on an image acquisition device, such scaling and radial distortions can be compensated for using hardware that allows both for global and local re-mappings of the image acquired at the sensor in real time such as disclosed in U.S. application Ser. No. 13/541,650. Otherwise or alternatively, this processing can be handled in software.

After the acquisition of these 16 image frames, they are compressed using conventional techniques such as JPEG and all frames are encapsulated into a data structure which appears as a standard JPEG image to most conventional software, but which allows the additional embedded images to be accessed by software that is aware of this image/data structure.

There are a number of possible choices for data structure that can be taken:

I. Storing all images as private data inside of a standard JPEG file (with .jpg extension). This can be done by either:
  a. Storing the additionally acquired images at the end of the jpeg file after the EOI (End Of Image) marker. This is reliable and compatible with all viewers. However, any edit and save operation performed with 3rd party editors will discard the additional images. The user may also be confused by the huge size of the file, which appears to only contain 1 image.
  b. Storing images in manufacturer-reserved APPx markers. This is again compatible with all viewers, and some (but not all) editors may preserve these markers while saving. However, the first image will be differently edited from the rest of the images in the stack and this may cause problems when such an edited image is to be viewed/edited in a viewer which is aware of the image structure. The size of APPx markers is limited to 64 KB each, and so a stream for the additional images would have to be segmented, generating many tens of such markers in total.

II. The CIPA Multi-Picture (MPO) Format (http://www.cipa jp/english/hyoujunka/kikaku/pdf/DC-007_E.pdj) provides a good example of an industry standard for such multi-image stacks. The MPO file format is essentially a sequence of JPEG images, with a standard header. It is a standard format and a user cannot edit 1 image individually. However, it is appreciated that not all image viewers recognize the MPO format, so the user will most probably have to use the viewer which is aware of the present invention on their device platform, for example. Windows, Mac, Android, iOS, ActiveX, or Adobe Flash.

III. It would also be possible to store both a simple JPEG with the first image only, and an MPO with the additional images and possibly the single first image.

Considering the number of images, the total storage space for a stacked image could be quite large. The 16$x$ decrease in the number of images that can be stored on card may be unexpected and inacceptable to the end-user. Thus in some embodiments of the invention an additional inter-frame compression of stacked images and their meta-data may be provided.

Preferred embodiments of the invention save a main JPEG image and a set of stacked, unprocessed images in an MPO format data structure. Typically JPEG compression is used for images within an MPO stack, but it is also possible to use wavelet or fractal-based block compression (e.g. JPEG 2000) rather than traditional DCT based compression of JPEG. The main image may be changed based on user-controlled re-processing of the stack. In what follows we will refer to the main image and the stack of sub-images. The sub-images in the stack are considered immutable, whereas the main image is expected to change. Thus to conventional software, the file appears as a single JPEG image that is acquired with the optimal focus for, say, the near face in FIG. 1. However to a viewer application that is aware of the stack data structure, the sub-images can be decompressed selectively based on user interaction with the displayed main image.

As described above, multiple images, acquired with increasing focus are stored in a unified data structure. In certain embodiments, a set of look-up tables may be provided either within the data structure or otherwise available to a viewer application. The tables are matched to the specific optical system of the camera or imaging device, with information for each of multiple focus lengths to allow image portions to be aligned and scaled. The required mappings for different focal lengths can be determined by empirical calibrations and are likely to be available for high-end cameras and incorporated into the hardware/software of the camera image processing pipeline (IPP). Alternatively, an analytic formula may be available to estimate radial offset/distortion of individual image pixels with the formula. Local alignment and/or blending techniques may be provided in some embodiments, and can be used advantageously where sub-pixel levels of accuracy are desired.

Image Decompression

In the preferred embodiment, once the viewer application loads the image stack for rendering to a display, the main (best focus) JPEG image is decoded and rendered. The alternative-focus sub-images, stored in MPO structure, are made available by buffering and pre-processing to enable direct access to sub-blocks within the corresponding JPEG bitstreams as described below.

Preferred embodiments employ a method to add additional indexing to a JPEG image when it is compressed. The indexing enables direct access to image blocks within the JPEG bitstream. As the size of a JPEG header is limited, there are some restrictions to the granularity of the indexing, but essentially it allows access so that an application can decompress local image tiles without needing to decompress the entire bitstream.

JPEG image data is typically stored on three separate sequential channels (Y, U, V), as Huffman-compressed, quantized DCT blocks of 8×8 pixels. Each block has as its first element 1 DC component, Huffman-encoded differentially from block to block+63 AC components, which are Huffman-encoded independently as RLE. It is also possible for the encoder to insert in the encoded stream an unspecified number of special markers named "Restart marker" (RST), which force the usage of absolute values of the subsequent DC components (basically interrupting the differential encoding of DC values). They are always byte-aligned and can be referenced to allow direct access to the stream, with the expense of a slightly decreased compression ratio.

The Huffman encoding generates a variable bit length for each element, dependent on the actual value i.e. the image contents, so it is impossible to predict. This makes the calculation of the bitstream offset for the start of a (x,y) image coordinate impossible.

Depending on the chroma subsampling method, these DCT blocks are aggregated in groups named MCUs (Minimal Coding Units), which represent the minimum possible pixel block that can be decoded separately. For example:
YUV420→MCU contains 4 Y blocks (2 horizontal+2 vertical)+1Cb+1Cr
YUV422→MCU contains 2 Y blocks (horizontal) |1Cb|1Cr
YUV444→MCU contains 1 Y block+1 Cb+1Cr
The sequence in the JPEG stream is Y1 . . . Y4; Cb; Cr Normal decoding involves the following steps:
1. The decoder reads the JFIF header and finds the offset in the file for the start of the bitstream and jumps to that position:
2. The decoder starts reading sequentially the Huffman-encoded bitstream and decodes it element-by-element
   a. The last decoded DC value for each channel Y, Cb, Cr is memorized for computing the next one;
   b. When an MCU is fully decoded to DCT coefficients, it can be either (depending on application use case):
      1. Returned as DCT blocks; or
      11. Converted to YUV values by iDCT and returned Thus, prior to getting the data for the first pixel of interest, the decoder has to Huffman decode all the preceding MCU blocks, then extract from the decoded area the exact pixels of interest. In many cases, the effort used to decompress the preceding data is far larger than decompressing the actual data of interest.

In preferred embodiments of the present invention, a set of file offsets in the bit stream corresponding to some special pre-determined locations in the bitstream is computed, for example, as follows:
1. Pre-compute the set of offsets during JPEG file encoding:
   By using RST markers and inserting RST markers every n-th MCU, for example, n=4. This provides an array of bytes comprising the RST marker byte offset.
   This fast data is called "simple fast data".
   By storing every n-th MCU start point, plus the absolute DC coordinates at this location, we obtain an array of pairs in the format MCU_info=(stream n_bit_offset, "DC values").
   This fast data is called "full fast data".
2. Pre-compute the set of offsets as a preliminary step during an initial full decoding of the image
   Depending on whether the image has an acceptable density of RST markers or not, we may create "simple" or "full" fast data respectively.

When random access to an area of an image is needed:
1. Compute the closest available index in "JPEG fast data" corresponding to an MCU immediately anterior to the area of interest.
2. Get the offset stored in MCU_info, seek in the stream
3. Do Huffman decoding for the number of consecutive MCUs corresponding to area of interest.
4. Repeat 1+2+3 if several partial rows of MCUs (non-consecutive MCUs) are needed to cover the area.
5. Once Huffman decoding completed,
   If "simple" fast data
      i. use the absolute DC values at the next MCU
   if "full" fast data
      i. use the DC info stored in the fast data blocks for computing the absolute value for the DC coefficients corresponding to Y, Cb, Cr. (Note however that Y data (luminance from YUV) only is required for sharpness detection.)

It will be seen from the description above that fast data information contains:
1. Simple fast data
   a. The byte offset in the JPEG file stream for the beginning of the RST block (1×32-bit value); or
2. Full fast data
   a. The bit offset in the JPEG file stream for the beginning of the MCU block (1×32-bit value)
   b. The IX components for all Y, Cb. Cr channels (3×16-bit values).

The total number of MCUs (or inserted RSTs) in an image is dependent on both the image size in pixels, and also the chroma subsampling (MCU size in pixels). Thus, large images subsampled as 444 or 422, contain a large number of MCUs which generate a significant amount of fast data. In order to minimize it, we may consider the less speed-optimal approach of saving data for only the n-th MCU, with n being either hardcoded or computed dynamically for each image. Especially in the case of progressive JPEG images, where fast data is recorded separately on each image scan, dynamically-computed fast data density is highly recommended.

This large byte size of fast data can be mitigated in several ways: observing that the offset values are always increasing, we can store instead only the delta between one value and the previous one. Furthermore, this sequence of delta values can be encoded by a differential PCM algorithm. Thus absolute numeric values are reduced to much smaller numbers. These smaller numbers can be further encoded by a Huffman algorithm.

As described, the fast data is generated as a stream of bytes. It can be stored in any location suitable to the viewer application (JPEG image file, image database, etc). In one implementation, the fast data can be saved within a JPG file as a binary block under the JPEG APP2 marker. As an additional component, a cache module can be employed to selectively and memory-efficiently cache blocks of uncompressed data (DCT or YUV).

Viewer Application

Now that the system for acquiring images and for indexing areas within images of a stack of images has been explained, we turn to an interactive image viewer application for enabling a user to manipulate these images. This application can run on the image acquisition device or it can run on a separate computer system which has access to the image file containing the stack of images.

In the preferred embodiment, the image viewer application allows the user to interact with the main (best focus) "display" image. More specifically, the main (best focus) image can be displayed on a touch-screen component of an acquisition device, tablet or computer. In the case, the user may therefore touch different parts of the displayed image. Nonetheless, this is not essential and the invention can be implemented on non-touch screen devices with conventional peripheral pointing devices. In any case, as parts of the displayed image are selected, the image viewer software transparently searches through the sub-images of the stack, selectively decompressing the relevant image blocks of the sub-images corresponding to the selected area of the display image as described above, and determines, which of these has an optimal focus measure at the selected point in the image.

For simple re-focus, the focus measure within the selected region is calculated for each sub-image in the focus stack and the image with the best focus measure is determined to be the optimally focused image for the object, or image region that the user has touched. Accordingly the application replaces the display image with the selected sub-image for display image. This embodiment allows the user to touch different objects in the image display and see the displayed image apparently re-focus on that object.

It should be noted that where individual images are not realigned prior to display, there can be a radial shift for objects near to the camera (in the macro region). Thus, replacing one display image with a sub-image for display can create an apparent slight inward/outward movement of objects as the user selects to focus on nearer/more distant objects within the imaged scene. This can gives a favorable impression of a zooming/de-zooming effect.

Note however that selection of local regions within sub-images should realign and compensate for radial shifting when making the focus measure comparisons to ensure that the same areas of the scene are being compared within images of the stack.

In a more sophisticated embodiment, multiple images from the stack are composited into a single "display" image. The initial approach is similar to the simple re-focus described above, in that the user simply touches different regions of the image. In some embodiments there may be settings that should be configured prior to selection; these might include the size of area around the center of a selection, the rate of growth/propagation of this area depending on how long the user maintains the selection (touch) and so on.

As the user maintains the selection (touches) the display image, the local focus measure for each image in the stack is computed for the region touched by the user. Again, before partially decompressing local regions of the stacked images, the selected region of the display image needs to be mapped spatially to corresponding local regions within the sub-images to compensate for radial shifting, as well as re-sizing or distortion-correction and to ensure that the same areas of the scene are being compared.

Once the sub-regions are selected based on this mapping from the display image to sub-image, local image blocks of the sub-image are decompressed. The viewer application performs any shifting, required on the selected de-compressed region of the image, then recalculates the local focus measure, and if the optimal local focus measure is higher than the local focus measure of the same region in the main image then the viewer application will begin to replace pixels in the main "display" image with "better focused" pixels from the relevant sub-image of the stack.

It will also continue to decompress and search surrounding image blocks for more optimally focused pixels. This process will continue as long as the user maintains their selection of a point on the displayed image.

Thus an "optimally focused" region spreads outwards from the user's selection, e.g. point at which they have touched the main displayed image.

This approach enables interactive re-focusing of the original image. In contrast to prior art techniques such as focus stacking which search throughout the entire stack of images and automatically obtain optimal focus for every pixel, this approach allows the user to decide which parts of the image they wish to emphasize through improved focus, and which parts to de-emphasize.

Figure 6A:
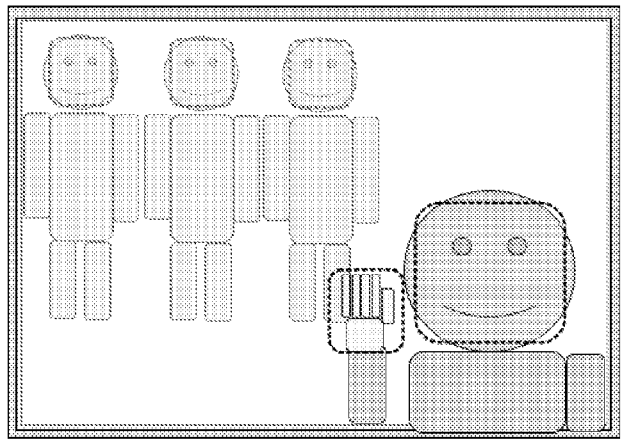
FIGS. 6(a) to (c) illustrate the operation of a viewer application processing an acquired image stack according to an embodiment of the present invention.
Figure 6B:
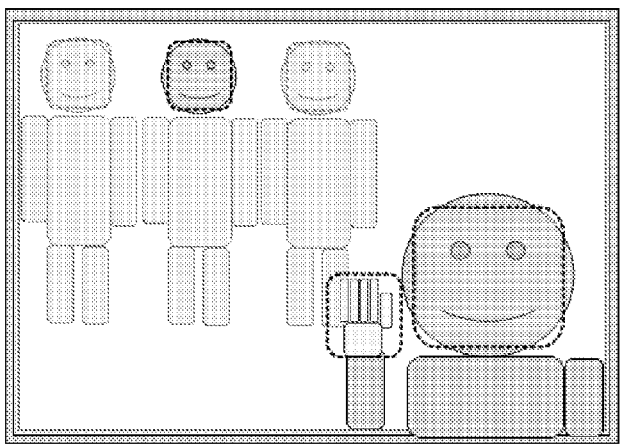
Figure 6C:
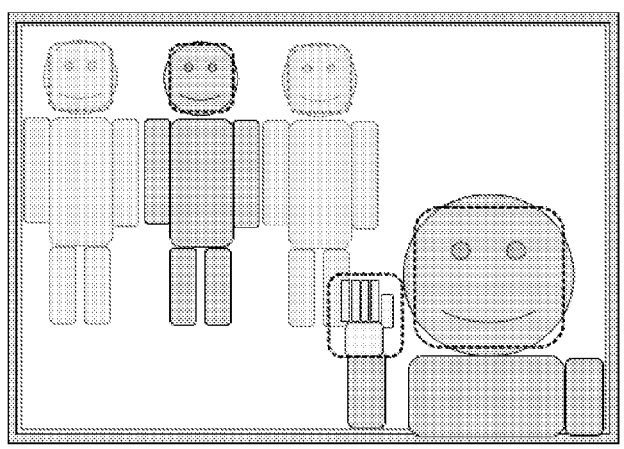

For example, FIG. 6a shows a main image where the frontal person is optimally focused. This is the largest face region and appears as the main subject of the image so it is natural that this will form the main (best focused) image that is initially displayed. We note that there are three additional subjects towards the back of the image. These are slightly blurred and out of focus; the user may wish only to bring one of these people into clear focus. This effect could not be readily achieved using conventional photography or imaging, but using the present invention, they only need to touch the face of the relevant person as shown in FIG. 6b and it will start to come into focus. They then draw their finger down the person's body and this also begins to come into clear focus—FIG. 6c.

Once the user has achieved the desired focus emphasis they can then save the final display image as a conventional JPEG within the image stack. The meta-data structure remains intact and can be re-used multiple times to generate new images with different parts of the image in focus.

Thus the user can modify the original image by selecting points of interest within the image and refining the local focus of those points; the longer they select (touch) a particular feature in the image the more the "re-focusing" from this point in the image spreads across the main image. This allows a user to increase the emphasis of certain features and obtain a composite image optimized with multiple focus points.

Note that it may also be desired to defocus certain regions of the image and techniques to achieve such an effect, under user control, will be described in the next section.

Multi-Touch Embodiments

In an alternative embodiment, multi-touch gestures can be used, not only to improve the focus in a particular area of the image, but also to de-focus selective regions of the image. For example, in a touch screen implementation, if the user rotates their finger in a circular, clockwise motion, this might indicate to the viewer application to increase the focus measure in a particular region.

This could involve determining the local focus measure for the main displayed image and, rather than obtaining and displaying pixels with the optimal focus immediately pixels with an improved, but probably not optimal, the focus measure could be initially obtained from the next JPEG image in sequence. Then, if the user continued to rotate their finger clockwise additional improvements in the focus measure could be determined and displayed, until eventually the optimally focused pixels would be displayed.

Contra-wise, if the user rotated their finger in an anti-clockwise direction on the touch-screen, then the viewer application would seek out a lower focus measure, essentially blurring that portion of the image. Again as the user moves their finger around the screen they can, effectively, dynamically adjust the local focus of different portions of the image. This allows more sophisticated control of image focus than is possible through current optical imaging, or indeed using focus stacking or even plenoptic imaging techniques where image re-focusing must be applied uniformly across the entire image.

Note that some rules to handle merging of pixels from different sub-images with the best-focus (main) image are needed, e.g. when an expanding region of focus overlaps with pixels of the main image that already have a higher focus measure score, the original pixels would be retained.

Also, because image blocks are restored from compressed JPEG blocks the focus measure is typically determined for image blocks, rather than individual pixels. Again some smart filtering combined with local alignment and interpolation is needed, taking account of additional image characteristics such as image texture, luminance and local gradients/edges to avoid "focus blocking" effects.

Video Embodiment

The above described embodiments apply to composite JPEG images with multiple focus points. However some video embodiments are also possible although with a more limited scope based on the constraints of today's technology.

As explained above the invention captures a scene at multiple focal points and stores these in a single data structure. For video it would not typically be possible to capture 16 focal positions for each video frame. However, it could be practical to enable say 4 different focal positions to be captured without catastrophic effects on frame rate.

For example, many of today's HD imaging devices can achieve 120 fps capture rates, or higher, at less than HD resolution (e.g. a 1080p camera can achieve this at 720p video resolution). Thus it is possible to capture four separate video sequences with four different focus points provided a fast-refocus subsystem is available.

In a preferred embodiment the user sets the viewfinder onto an initial video scene and the imaging device determines a number of ROIs within this scene and performs an initial auto-focus on each of these. The user next selects up to, say, 4 of these ROIs and initiates the video capture.

The camera adjusts focus to the first ROI and determines its focus measure. If this has changed from the previous acquisition then it records that focus should be adjusted on the next acquisition for this ROI and buffers this frame in a first video buffer. It then adjusts focus to the second ROI and determines its focus measure, recording if this has changed and if focus should be adjusted accordingly and stores this video frame in a second video buffer.

The camera continues to cycle through each ROI storing the video frames focused on that ROI in its video buffer. Focus is adjusted independently for each ROI according to the last focus measure determined for that ROI.

Each video buffer is compressed independently into a distinct MPEG stream. As for the JPEG image stack, these streams are typically stored within a data container analogous to MPO.

Note that this assumes the camera continues to follow each ROI throughout a video capture session—the preferred embodiment uses faces as ROIs and employs in-camera face tracking to follow each ROI while operating in this 'multi-focus tracking' mode. Naturally a problem will arise if one of the ROIs leaves the current video frame or moves to the edge, causing the face-tracking module to lose its 'face lock'. In this case the camera may either (i) cease video capture for that buffer; or (ii) continue capture, but at the last known focus setting for the lost ROI. The camera should prompt that one of its 'subjects' has been lost and may optionally prompt the user to select an alternative ROI to track/focus if other faces were available within the scene.

On viewing the user can touch any of the selected ROIs to activate the video stream with optimal focus for that ROI. The longer they touch an ROI the larger the area around that ROI that will be used in the final rendered video.

In a preferred embodiment a graphical "ring" or similar indicator moves outward from the center of the ROI to indicate how much of that focus stream will be overlaid onto the main video stream. As in the image based techniques described earlier, optical correction data may be stored to correct for magnification effects and lens distortions.

Radial Shifting

Figure 7:
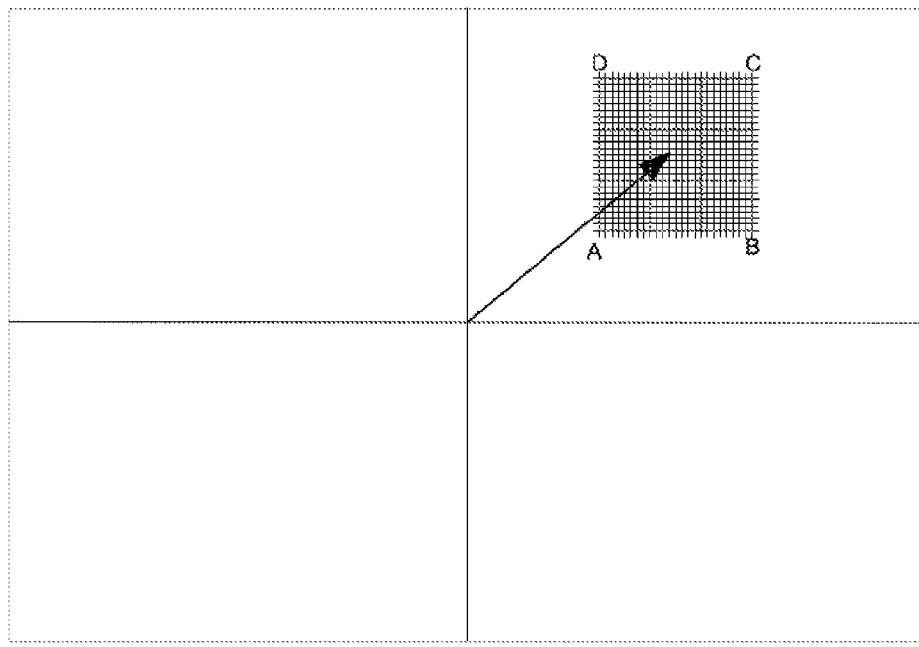
FIG. 7 shows a touched point within a main image and a surrounding refocus region (ABCD) comprising 3×3 JPEG 8×8 blocks.

In the embodiments described above, the user selects/points/touches a specific point within the main, displayed image of the stacked image structure. The point of "touch" is illustrated as being at the end of the arrow in FIG. 7.

The arrow represents the radial distance from the center of the image. (This presupposes a radially symmetric focus magnification effect which is typically the case for MEMS lenses).

However, if the optics are modified to, for example, accommodate a wider aspect ratio on the display—then an elliptically symmetric lens might be employed, in which case the polar frame of reference used below should be substituted with an elliptical frame of reference. Other alternative optical geometries, for example, extended depth of field (EDOF) lenses might require more sophisticated frames of reference, but can be approximated by the techniques outlined below, on the assumption that the "refocus region" is small relative to the overall size of image.

The "focus region" within the example, is 3×3 JPEG image blocks. Thus the main point of contact is located in a central JPEG block and the first set of surrounding blocks are also included to provide a representative sample of the image region which is to be refocused. Naturally the size of this region can be varied depending on the overall image size, the nature of the image scene (a larger refocus region would be preferred in an image that is "uncluttered"). Ideally the refocus region would include enough image detail and significant features to allow useful variations in the focus measure to be determined across the images in the stack. If the results of scene analysis are available, these may be employed to make an improved determination of the size of the refocus region. For example, if face tracking information is available, the size of refocus region might be enlarged to encompass an entire face region, or a high contrast portion of that region, such as the central eyes & nose region. Similarly, blink and smile detection might be used to determine if it is better to use eye-regions (lower contrast if eyes are closed) or mouth regions (better contrast if a full smile is available).

Other low-level image maps, such as variance, contrast or gradient maps may be available for the stacked images, and can inform the viewer application if there is likely to be sufficient image variability within an initially selected refocus region. If not, then the size of the refocus region may be enlarged to include image features with sufficient variability to provide a useful variation in focus measure.

Ideally the focus region is expanded to correspond to an integer set of JPEG blocks. While we discuss a rectangular shape in this example, it is not required and the JPEG block structure can be variable. Additional blocks might be included because the corresponding regions of the image include good image variability while other blocks might be excluded because their variability across the image stack is low. Also, the ABCD region shown in FIG. 7 need not align with an integer set of JPEG blocks, although this will require decompressing more JPEG blocks during subsequent operations.

In some embodiments the outward speed of propagation of the re-focus region may be determined from in-camera scene analysis data. For example, if the region initially selected for re-focus exhibits low variance, thus few image features that would help determine an accurate focus measure, then a higher propagation rate may be used until the re-focus region contains some sharper, high-variance features and a better focus measure can be obtained.

After the initial refocus region is determined, it is next necessary to determine corresponding regions with each of the other images within the focus stack. This is illustrated for a single image in FIG. 8 where the magnification factor for that image is known and is given as MF=dR/R. Thus the center of the image region located at radial distance R is displaced an additional amount dR=MF×R in the second (magnified) image.

The MF can be determined through calibration or by optical analysis of the lens system. Typically it changes most rapidly in the MACRO region lying between 0.1 and 1-3 meters from the lens. Beyond this range there is very little variation in the image.

Figure 8:
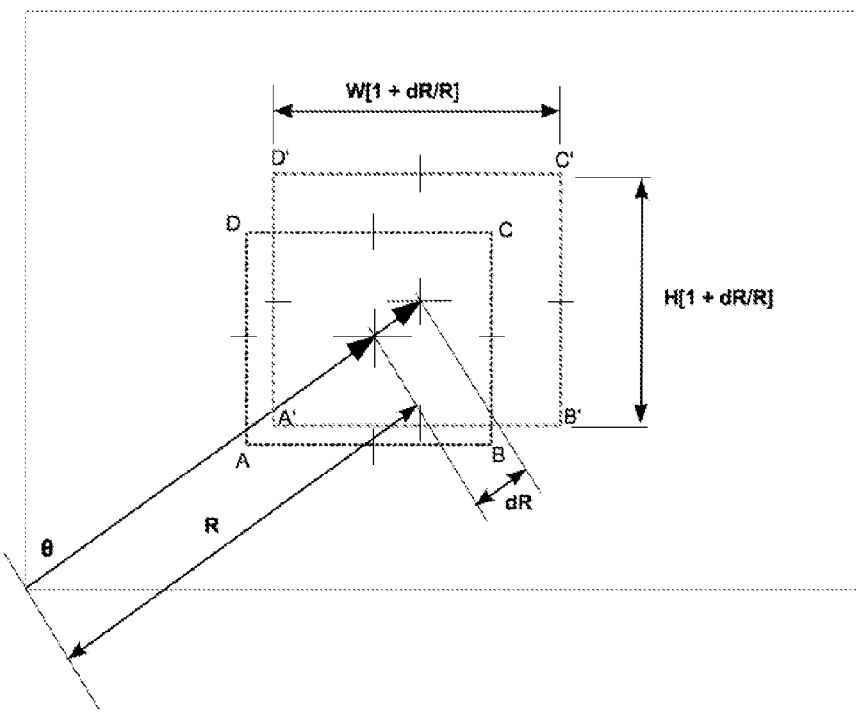
FIG. 8 shows a region A'B'C'D' for a stacked image corresponding to the original ABCD refocus region in the main/displayed image of FIG. 8.

As can be seen in FIG. 8, the corresponding A'B'C'D' region has its center shifted by a radial distance dR=MF×R and its dimensions increased by W×dR/R and H×dR/R, assuming that the refocus region is relatively small compared to the overall image size. Given that typically digital images from consumer devices are 4 k×3 k and the largest JPEG block size is 16×16 pixels this is a good approximation even where the refocus region grows to be 10×10 JPEG blocks (160×160 pixels).

Now this region A'B'C'D' must be mapped onto the appropriate set of JPEG blocks from the second or indeed any other stacked image. Again, where the JPEG image comprises separate Y, U, V grayscale images, each corresponding to a channel (Y or U or V), the operation below need only be executed for the image corresponding to Y channel. In any case, the steps performed by the viewer application are as follows:

1. Calculate the x, y coordinate representing the top-left corner (D') of the rectangle to be decompressed for focus calculation.
2. Calculate the MCU corresponding to this coordinate and then determine the latest RST marker before the calculated MCU.
3. Using the fast data, seek the RST marker in the JPEG binary stream, and decode the MCUs in between the RST marker and MCU of interest
4. Decode the MCUs of interest (Y channel only).
6. Repeat from step 2, from line (y+8) or (y+16) (depending on chroma subsampling), for subsequent rows of MCUs until the bottom-right corner (B') is passed.

Figure 9:
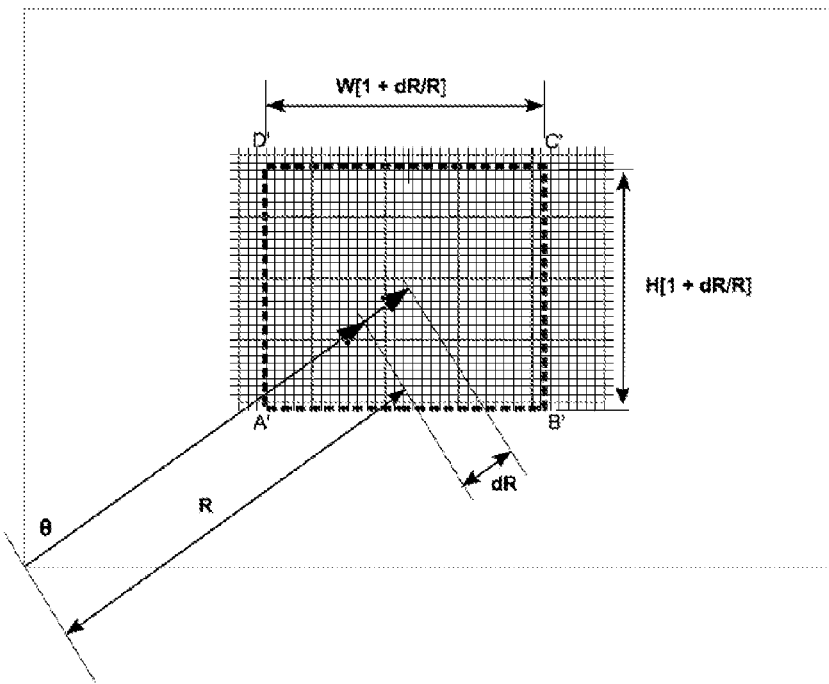
FIG. 9 shows decompressed JPEG blocks which encompass the required A'B'C'D' refocus region of FIG. 8 in the next image from the stack.

The operation to find A'B'C'D' and decompress the relevant JPEG blocks is repeated for each image in the stack. A focus measure is then calculated for the relevant A'B'C'D' (which does not match exactly the decompressed JPEG blocks which are a superset of (i.e. larger than) the A'B'C'D' region), FIG. 9.

As mentioned above, the approximations above are valid if the size of the refocus region is smaller than the relative size of the image. Typically this is valid if the dimensions of the region are less than 5% of main image area, although there is variation on this threshold depending on the location (radial distance) of the region and the configuration of the optical system.

Where it is required to use a larger refocus region—for example where a larger face region, or foreground object, is included in the image—then it may be partitioned. The method of partition depends on the embodiment and may be automatic, or based on user input.

Figure 10:
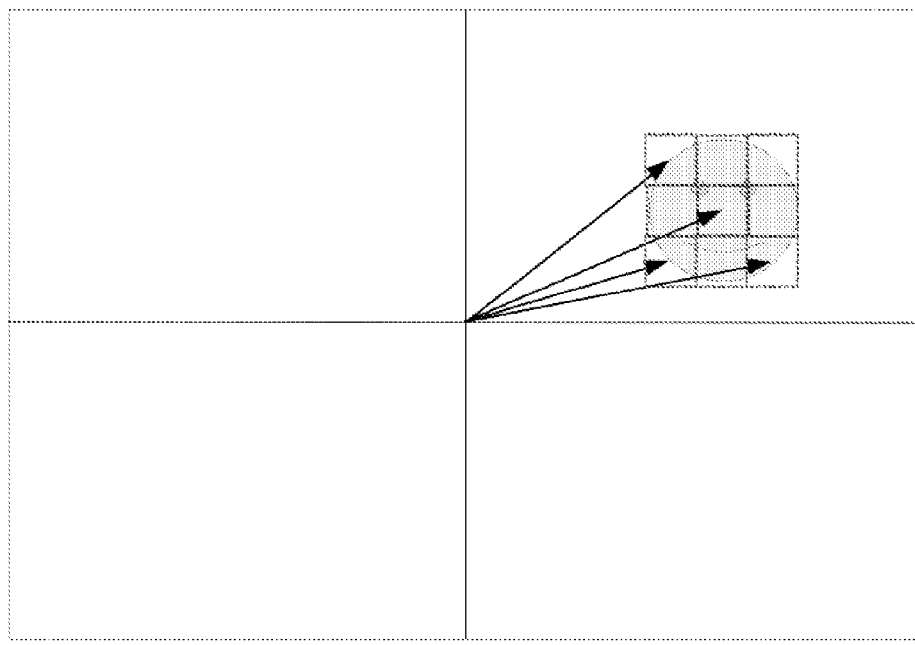
FIG. 10 shows an image including a face region partitioned into a number of sub-blocks before being processed according to an embodiment of the present invention.

Referring to FIG. 10, in one embodiment a known region, such as a face region, is first determined. It is relatively straightforward to partition such a region into multiple ABCD sub-blocks and to use multiple radial R-vectors and to partition the main focus region into several distinct regions as shown in FIG. 10 (not all R-vectors are shown for reasons of clarity). A separate focus factor is calculated for each sub-block and these may be averaged to determine the overall focus measure within the combined region. This common focus measure is then used to select a sub-image from the focus stack for decompression, with each sub-block of the refocus region being obtained from the same sub-image and the common focus measure calculated as for the main image.

In alternative embodiments, a common focus measure may be determined based on knowledge of the object/region of interest, in the case of a face region such as in FIG. 1Q a central sub-block including the eye/nose region typically exhibits a maximum variance and will provide a more accurate focus measure; thus in one embodiment, the common focus measure may be determined from said central sub-block in each of the main image and the stack of sub-images.

In an alternative embodiment, an object region is determined by user selection (touch or point & click) and a natural boundary to that object is determined (e.g. using edge detection and segmentation). This region is next partitioned in terms of JPEG blocks—FIG. 1 (*i*)—and the region is organized into a set of congruent ABCD blocks as shown in FIG. 11 (*ii*). These are optimized to minimize the number of ABCD blocks while ensuring that each block overlaps with >65% of the object region. The region is next processed as shown in FIG. 11(*iii*) (not all R-vectors are shown for reasons of clarity) as described for the example of FIG. 10.

In some alternative embodiments, the sub-blocks of a region may be refocused independently where it is desired to have the entire object appear 'in-focus'. In other embodiments, based on knowledge of the form or structure of an object, it may be required to force certain sub-regions to appear more distant or closer than the average focus of a region. In such embodiments, the sub-blocks of the object are first re-composited, based on some knowledge of the object boundary and/or structure. The entire, re-composited, re-focused object is then composited back into the original scene/image.

It is work noting that, where they are used, the DCT coefficients which are calculated as part of JPEG compression and decompression can be used as an indicator of focus, for example as disclosed in Jaehwan Jeon; Jinhee Ise; Joonki Paik, "Robust focus measure for unsupervised auto-focusing based on optimum discrete cosine transform coefficients," IEEE Transactions on Consumer Electronics, vol. 57, no. 1, pp. 1-5, February 2011; and Sang-Yong Lee; Jae-Tack Yoo; Kumar, Y.; Soo-Won Kim, "Reduced Energy-Ratio Measure for Robust Autofocusing in Digital Camera," Signal *Processing Letters, IEEE, vol.* 16, no. 2, pp. 133-136, February 2009.

Thus, instead of calculating the focus measure by fully decompressing the A'B'C'D' region, it is sufficient to determine which JPEG blocks are members of this region and to average the relevant DCT coefficients across these blocks to obtain a first focus measure. In this embodiment it is not necessary to fully decompress—the stacked JPEG image only needs to be partially decompressed to DCT level in order to determine the focus measure. Then, if this sub-image is chosen, because its blocks are either more in-focus (or out-of-focus) than other images of the stack, the DCT blocks can be fully decoded for use within the display image.

It will be appreciated the above described re-focusing techniques rely on luminance information only and so for YUV images, only the Y channel needs to be decoded. If stacked images are stored in conventional JPEG format, then conventional Huffman decoding would still be required for all channels. To avoid this, each sub-image of the stack could be encoded as individual grayscale JPEGs (one for each Y, U, V). U and V JPEGs for a sub-image would then only need to be decompressed when displaying that sub-image on screen. Thus, while such stacked images might not be readable by conventional viewers, re-focusing in a viewer application which was aware of this structure could be much more efficient.

In the above described embodiments, the sub-images of the stack can be of the same, lower or indeed higher resolution than the display image. Similarly, they can be stored with the same, higher compression (greater loss) or indeed lower compression than the display image.

The above embodiments have been described as working primarily with JPEG encoded images. However, it will be appreciated that the invention could equally be implemented using other image formats including for example, HEVC (High Efficiency Video Coding).

What is claimed is:

1. A computer-implemented method for viewing images on an interactive computing device, the method comprising:
   receiving a plurality of images of nominally the same scene wherein the plurality of images comprises a main image having a main focus measure, and one or more sub-images having sub-image focus measures different from the main focus measure;
   displaying the main image on a display device;
   detecting a user selecting a portion of the main image and providing one or more motion inputs wherein:
      the one or more motion inputs specify a first motion direction or a second motion direction;
   responsive to the user selecting the portion of the main image and providing the one or more motion inputs, determining whether the one or more motion inputs indicate the first motion direction or the second motion direction;
   in response to determining that the one or more motion inputs indicate the first motion direction or the second motion direction, determining from the one or more sub-images, a first sub-image that depicts at least the portion of the main image and has a first focus measure that is different than the main focus measure;
   creating a modified main image by modifying the portion of the main image using the portion of the first sub-image;
   displaying the modified main image on the display device wherein,
   responsive to the user selecting a particular point in said portion of the main image, the steps of determining said first sub-image and creating the modified main image include:
      determining, in the main image, a refocus region comprising a grouping of pixels that includes the particular point;
      determining a size and a location of the refocus region;
      based, at least in part, on the size and the location of the refocus region of the particular point within the main image, determining a magnification factor;
      based, at least in part on the magnification factor and the location of the refocus region, determining a modified refocus region within the main image;
      determining said first sub-image, from the one or more sub-images, as one that depicts at least a part of the refocus region and for which the focus measure is different than the main focus measure; and
      modifying the main image by modifying the modified refocus region using contents of said first sub-image, and wherein the method is performed using one or more computing devices.

2. The method of claim 1, wherein the refocus region is determined based, at least in part, on:
   identifying one or more features in a neighborhood of the particular point of the main image, and
   defining the refocus region that has a rectangular shape and that encompasses the one or more features; and
   wherein the magnification factor is determined based, at least in part, on a distance between a center point of the main image and the particular point of the image.

3. An interactive computing device comprising a processor and a display, wherein the processor is arranged to perform:
receiving a plurality of images of nominally the same scene,
the plurality of images comprising a main image having a main focus measure, and one or more sub-images having sub-image focus measures different from the main focus measure;
displaying the main image on a display device;
detecting a user selecting a portion of the main image and providing one or more motion inputs, wherein the one or more motion inputs include a first motion direction or a second motion direction;
responsive to the user selecting the portion of the main image and providing the one or more motion inputs, determining whether the one or more motion inputs indicate the first motion direction or the second motion direction;
in response to determining that the one or more motion inputs indicate the first motion direction or the second motion direction:
determining a first sub-image, from the one or more sub-images, that depicts at least the portion of the main image and has a first focus measure that is different than the main focus measure;
creating a modified main image by modifying the portion of the main image using the portion of the first sub-image; and
displaying the modified main image on the display device wherein, responsive to the user selecting a particular point in said portion of the main image, the steps of determining said first sub-image and creating the modified main image include:
determining, in the main image, a refocus region comprising a grouping of pixels that includes the particular point;
determining a size and a location of the refocus region;
based, at least in part, on the size and the location of the refocus region of the particular point within the main image, determining a magnification factor; based, at least in part, on the magnification factor and the location of the refocus region, determining a modified refocus region within the main image;
determining said first sub-image, from the one or more sub-images, as one that depicts at least a part of the refocus region and for which the focus measure is different than the main focus measure; and
modifying the main image by modifying the modified refocus region using contents of said first sub-image.
4. The interactive computing device of claim 3, wherein:
the refocus region is determined based, at least in part, on identifying one or more features in a neighborhood of the particular point of the main image, and defining the refocus region that has a rectangular shape and that encompasses the one or more features; and
the magnification factor is determined based, at least in part, on a distance between a center point of the main image and the particular point of the image.
5. A non-transitory, computer-readable storage medium storing executable instructions which, when executed by one or more processors of an interactive computing device, cause the device to:
receive a plurality of images of nominally the same scene wherein the plurality of images comprises a main image having a main focus measure, and one or more sub-images having sub-image focus measures different from the main focus measure;
display the main image on a display device;
detect a user selecting a portion of the main image and providing one or more motion inputs, wherein:
the one or more motion inputs specify a first motion direction or a second motion direction;
responsive to the user selecting the portion of the main image and providing the one or more motion inputs, determine whether the one or more motion inputs indicate the first motion direction or the second motion direction;
in response to determining that the one or more motion inputs indicate the first motion direction:
determine a first sub-image, from the one or more sub-images, that depicts at least the portion of the main image and has a first focus measure that is higher than the main focus measure;
create a modified main image by modifying the portion of the main image using the portion of the first sub-image; and
display the modified main image on the display device wherein, responsive to the user selecting a particular point in said portion of the main image, the steps to determine said first sub-image and create the modified main image include:
determining, in the main image, a refocus region comprising a grouping of pixels that includes the particular point;
determining a size and a location of the refocus region;
based, at least in part, on the size and the location of the refocus region of the particular point within the main image, determining a magnification factor;
based, at least in part, on the magnification factor and the location of the refocus region, determine a modified refocus region within the main image;
determine said first sub-image, from the one or more sub-images, as one that depicts at least a part of the refocus region and for which the focus measure is different than the main focus measure; and
modifying the main image by modifying the modified refocus region using contents of said first sub-image.
6. A computer-implemented method for viewing images on an interactive computing device, the method comprising:
receiving a plurality of images of nominally the same scene wherein the plurality of images comprises a main image having a main focus measure, and one or more sub-images having sub-image focus measures different from the main focus measure;
displaying the main image on a display device;
responsive to a user selecting, touching or pointing to a particular point of the main image:
determining, in the main image, a refocus region comprising a grouping of pixels that includes the particular point;
determining a size and a location of the refocus region;
based, at least in part, on the size and the location of the refocus region of the particular point within the main image, determining a magnification factor;
based, at least in part, on the magnification factor and the location of the refocus region, determining a modified refocus region within the main image;
determining a first sub-image, from the one or more sub-images, that depicts at least a part of the refocus region and has a first focus measure different than the main focus measure;

modifying the main image by modifying the modified refocus region of the main image using contents of the third sub-image; and displaying the modified main image on the display device wherein the method is performed using one or more computing devices.

7. The method of claim 6, wherein the refocus region is determined based, at least in part, on identifying one or more features in a neighborhood of the particular point of the main image, and defining the refocus region that has a rectangular shape and that encompasses the one or more features; and wherein the magnification factor is determined based, at least in part, on a distance between a center point of the main image and the particular point of the image.

8. The method of claim 6, further comprising:

detecting the user selecting a portion of the main image and providing one or more motions inputs;

wherein the one or more motion inputs specify a first motion direction or a second motion direction;

wherein the first motion direction is one of clockwise motion and counter-clockwise motion;

wherein the second motion direction is the other of clockwise motion and counter-clockwise motion;

responsive to the user selecting the portion of the main image and providing the one or more motion inputs:

determining whether the one or more motion inputs indicate the first motion direction or the second motion direction;

in response to determining that the one or more motion inputs indicate the first motion direction:

determining a first sub-image, from the one or more sub-images, that depicts at least the portion of the main image and has a first focus measure that is higher than the main focus measure;

creating a modified main image by modifying the portion of the main image using the portion of the first sub-image; and displaying the modified main image on the display device.

9. The method of claim 8, in response to determining that the one or more motion inputs indicate the second motion direction:

determining a second sub-image, from the one or more sub-images, that depicts at least the portion of the main image and has a second focus measure that is lower than the main focus measure;

modifying the portion of the main image using the portion of the second sub-image; and displaying the modified main image on the display device.

10. The method of claim 8, wherein modifying the portion of the main image using the portion of the first sub-image causes improving or reducing a focus of pixels in the portion of the modified main image.

11. The method of claim 8, wherein the one or more motion inputs are provided via a touch screen;

wherein the one or more motion inputs are detected when an object is being moved on a surface of the touch screen;

wherein a third sub-image, of the plurality of images, is a compressed sub-image; and wherein a fourth sub-image, of the plurality of images, has a sub-image focus measure determined for image blocks.

12. The method of claim 8, further comprising:

in response to determining that an expanding region of the main image comprises an image texture region and is to be modified using the portion of the first sub-image, applying one or more local alignment or interpolation techniques to the expanding region of the main image to avoid focus blocking effects.

13. An interactive computing device comprising a processor and a display, with the processor arranged to perform:

receiving a plurality of images of nominally the same scene wherein the plurality of images comprises a main image having a main focus measure, and one or more sub-images having sub-image focus measures different from the main focus measure;

displaying the main image on a display device;

responsive to a user selecting, touching or pointing to a particular point of the main image:

determining, in the main image, a refocus region comprising a grouping of pixels that includes the particular point;

determining a size and a location of the refocus region;

based, at least in part, on the size and the location of the refocus region of the particular point within the main image, determining a magnification factor;

based, at least in part, on the magnification factor and the location of the refocus region, determining a modified refocus region within the main image;

determining a first sub-image, from the one or more sub-images, that depicts at least a part of the refocus region and has a focus measure different than the main focus measure;

modifying the main image by modifying the modified refocus region of the main image using contents of the first sub-image; and displaying the modified main image on the display device.

14. The interactive computing device of claim 13, wherein the refocus region is determined based, at least in part, on identifying one or more features in a neighborhood of the particular point of the main image, and defining the refocus region that has a rectangular shape and that encompasses the one or more features; and wherein the magnification factor is determined based, at least in part, on a distance between a center point of the main image and the particular point of the image.

15. The interactive computing device of claim 13, wherein the processor is further arranged to perform:

detecting the user selecting a portion of the main image and providing one or more motions inputs;

wherein the one or more motion inputs specify a first motion direction or a second motion direction;

wherein the first motion direction is one of clockwise motion and counter-clockwise motion;

wherein the second motion direction is the other of clockwise motion and counter-clockwise motion;

responsive to the user selecting the portion of the main image and providing the one or more motion inputs:

determining whether the one or more motion inputs indicate the first motion direction or the second motion direction;

in response to determining that the one or more motion inputs indicate the first motion direction:

determining a first sub-image, from the one or more sub-images, that depicts at least the portion of the main image and has a first focus measure that is higher than the main focus measure;

creating a modified main image by modifying the portion of the main image using the portion of the first sub-image; and displaying the modified main image on the display device.

16. The interactive computing device of claim 15, wherein the processor is further arranged to perform:
in response to determining that the one or more motion inputs indicate the second motion direction:
determining a second sub-image, from the one or more sub-images, that depicts at least the portion of the main image and has a second focus measure that is lower than the main focus measure;
modifying the portion of the main image using the portion of the second sub-image; and
displaying the modified main image on the display device.

17. The interactive computing device of claim 15, wherein modifying the portion of the main image using the portion of the first sub-image causes improving or reducing a focus of pixels in the portion of the modified main image.

18. The interactive computing device of claim 15, wherein the one or more motion inputs are provided via a touch screen;
wherein the one or more motion inputs are detected when an object is being moved on a surface of the touch screen;
wherein a third sub-image, of the plurality of images, is a compressed sub-image; and
wherein a fourth sub-image, of the plurality of images, has a sub-image focus measure determined for image blocks.

19. The interactive computing device of claim 15, wherein the processor is further arranged to perform:
in response to determining that an expanding region of the main image comprises an image texture region and is to be modified using the portion of the first sub-image, applying one or more local alignment or interpolation techniques to the expanding region of the main image to avoid focus blocking effects.

20. A non-transitory, computer-readable storage medium storing one or more executable instructions which, when executed by one or more processors of an interactive computing device, cause performance of:
receiving a plurality of images of nominally the same scene;
wherein the plurality of images comprises a main image having a main focus measure, and one or more sub-images having sub-image focus measures different from the main focus measure;
displaying the main image on a display device;
responsive to a user selecting, touching or pointing to a particular point of the main image:
determining, in the main image, a refocus region comprising a grouping of pixels that includes the particular point;
determining a size and a location of the refocus region;
based, at least in part, on the size and the location of the refocus region of the particular point within the main image, determining a magnification factor;
based, at least in part, on the magnification factor and the location of the refocus region, determine a modified refocus region within the main image;
determining a third sub-image, from the one or more sub-images, that depicts at least a part of the refocus region and has a third focus measure that is higher than the main focus measure;
modifying the main image by modifying the modified refocus region of the main image using contents of the third sub-image; and
displaying the modified main image on the display device.

21. The non-transitory, computer-readable storage medium of claim 20,
wherein the refocus region is determined based, at least in part, on identifying one or more features in a neighborhood of the particular point of the main image, and defining the refocus region that has a rectangular shape and that encompasses the one or more features; and
wherein the magnification factor is determined based, at least in part, on a distance between a center point of the main image and the particular point of the image.

22. The non-transitory, computer-readable storage medium of claim 20, storing additional executable instructions which, when executed by the one or more processors of an interactive computing device, cause performance of:
detecting the user selecting a portion of the main image and providing one or more motions inputs;
wherein the one or more motion inputs specify a first motion direction or a second motion direction;
wherein the first motion direction is one of clockwise motion and counter-clockwise motion;
wherein the second motion direction is the other of clockwise motion and counter-clockwise motion;
responsive to the user selecting the portion of the main image and providing the one or more motion inputs:
determining whether the one or more motion inputs indicate the first motion direction or the second motion direction;
in response to determining that the one or more motion inputs indicate the first motion direction:
determining a first sub-image, from the one or more sub-images, that depicts at least the portion of the main image and has a first focus measure that is higher than the main focus measure;
creating a modified main image by modifying the portion of the main image using the portion of the first sub-image; and
displaying the modified main image on the display device.

23. The non-transitory, computer-readable storage medium of claim 22, storing additional executable instructions which, when executed by the one or more processors of an interactive computing device, cause performance of:
in response to determining that the one or more motion inputs indicate the second motion direction:
determining a second sub-image, from the one or more sub-images, that depicts at least the portion of the main image and has a second focus measure that is lower than the main focus measure;
modifying the portion of the main image using the portion of the second sub-image; and
displaying the modified main image on the display device.

24. The non-transitory, computer-readable storage medium of claim 22,
wherein modifying the portion of the main image using the portion of the first sub-image causes improving or reducing a focus of pixels in the portion of the modified main image.

25. The non-transitory, computer-readable storage medium of claim 22, wherein the one or more motion inputs are provided via a touch screen;
wherein the one or more motion inputs are detected when an object is being moved on a surface of the touch screen;
wherein a third sub-image, of the plurality of images, is a compressed sub-image; and
wherein a fourth sub-image, of the plurality of images, has a sub-image focus measure determined for image blocks.

26. The non-transitory, computer-readable storage medium of claim 22, storing additional executable instructions which, when executed by the one or more processors of an interactive computing device, cause performance of:
in response to determining that an expanding region of the main image comprises an image texture region and is to be modified using the portion of the first sub-image, applying one or more local alignment or interpolation techniques to the expanding region of the main image to avoid focus blocking effects.

* * * * *